July 13, 1965  E. B. BYAM  3,194,048
TOGGLE GRIP MECHANISM
Filed Jan. 10, 1963  3 Sheets-Sheet 1
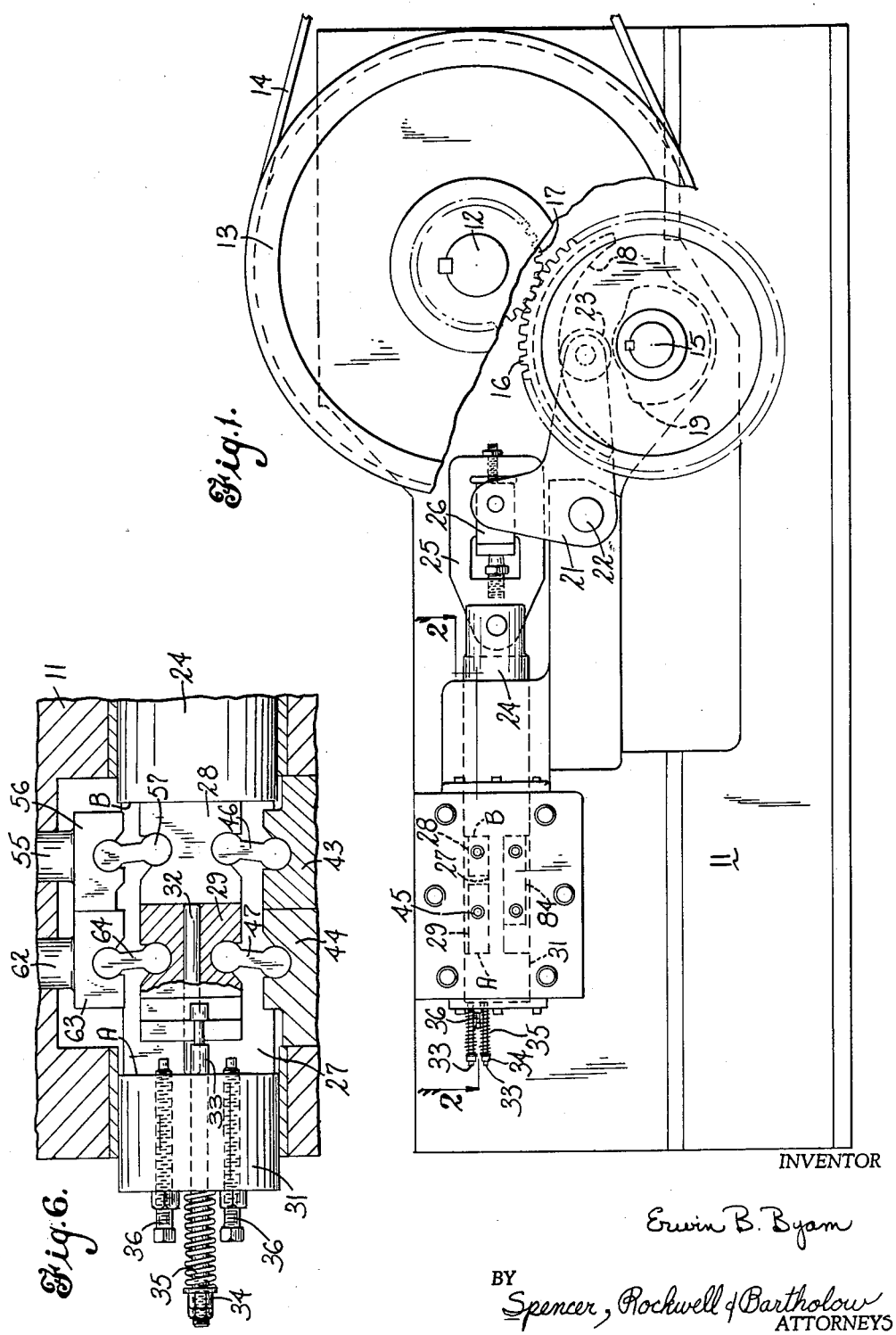
INVENTOR
Erwin B. Byam
BY Spencer, Rockwell & Bartholow
ATTORNEYS

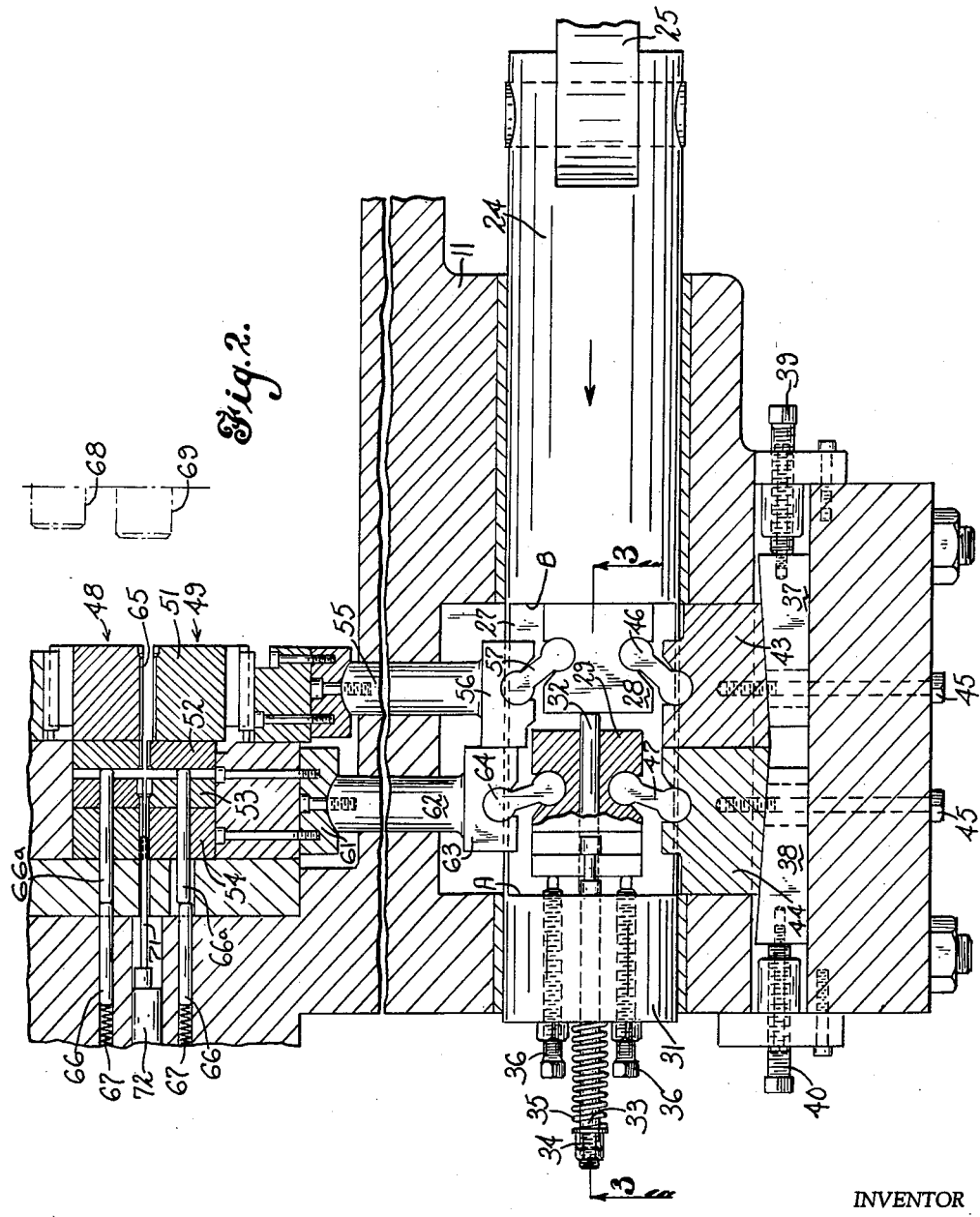

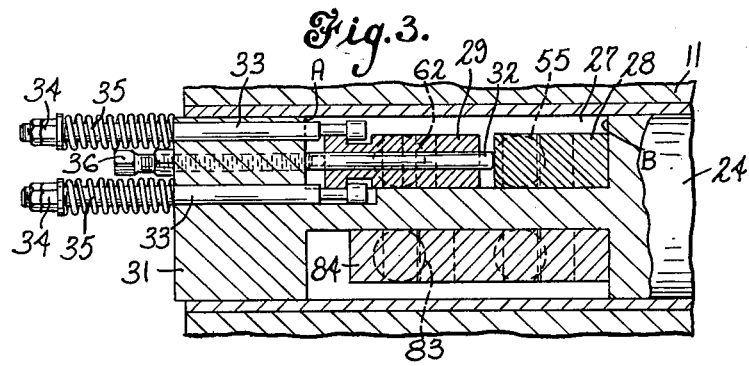
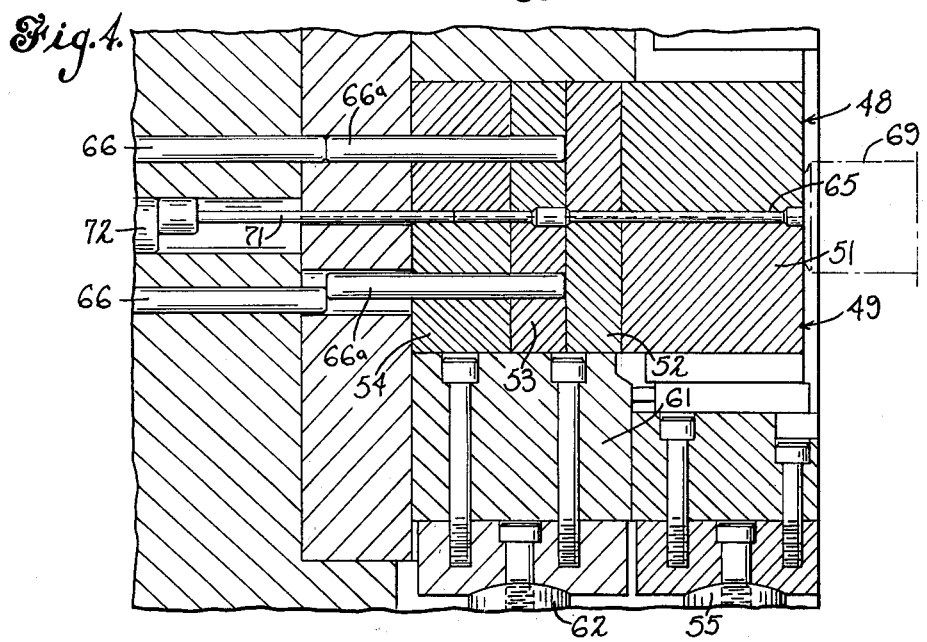
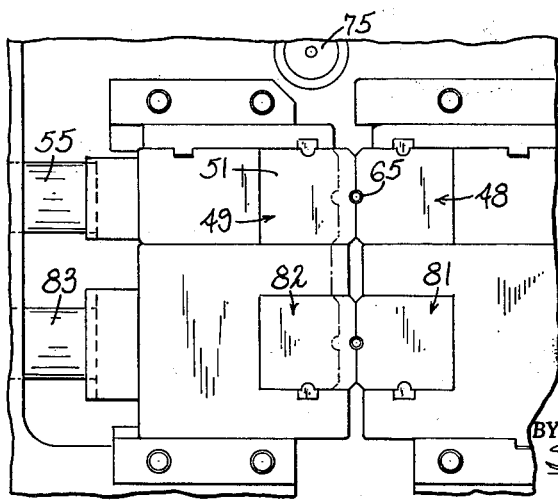

United States Patent Office 3,194,048
Patented July 13, 1965

3,194,048
TOGGLE GRIP MECHANISM
Erwin B. Byam, Wolcott, Conn., assignor to
Textron Inc., Providence, R.I.
Filed Jan. 10, 1963, Ser. No. 250,635
15 Claims. (Cl. 72—405)

This invention relates to a heading machine especially of the horizontal type, wherein a length of stock is gripped in a die and operated on by one or more punches to head or otherwise deform the length of stock or workpiece. More particularly, the invention is directed to a header utilizing one or more split dies which may be opened and closed and is sometimes known as an open die machine. The invention is directed to apparatus for opening and closing a die in which the workpiece is expanded for a portion along its length intermediate its ends. Normally, the workpiece is expanded or headed at the end adjacent the face of the die. The invention is contemplated for use in a machine provided with at least two dies, one above or axially displaced from the other, with transfer between the die forming the first station and the next adjacent die being required.

In the usual machine of this type, a relatively long workpiece is severed from a length of rod stock fed to the machine at the cut-off station. The severed workpiece is transferred to the first open die forming the first die station. When the workpiece is positioned in the die, the die closes and securely grips the workpiece so that operations may be performed thereon by one or more punches. Usually the workpiece is expanded or headed at the outer end. After completion of the operations at the first station, the die opens to permit the workpiece to be partially ejected so that the outer end may be gripped by transfer fingers. Then the die opens an additional amount to allow the workpiece to be transferred between the interfaces of the die halves to the next adjacent station. Utilization of the split or open die is advantageous, since it eliminates the necessity of fully ejecting a long workpiece from the die. Transfer between the interfaces of the open die halves allows a smaller machine to handle a workpiece whose length is greater than the clearance between the punch and the die at the position of maximum clearance. It is noted that the amount of initial opening is not sufficient to allow the workpiece to fall or be displaced from the die cavity. In this manner, control over the workpiece is maintained until the transfer fingers grip the workpiece and assume control thereof. Thereafter, the die may open the additional amount to allow the workpiece to pass between the die halves without concern that control over the workpiece will be lost.

However, it is desirable in some cases to form the workpiece with an expanded section intermediate its ends. In such a case, the initial opening of the die halves to allow the larger size interior segment to clear that portion of the die cavity blocking the workpiece from partial ejection, may be so large that the workpiece will fall from the die cavity or become disoriented before the transfer fingers can assume control. Thus, the usual open die mechanism cannot be used where the workpiece is to be expanded other than at the end adjacent the surface of the die.

Accordingly, it is a primary object of this invention to provide means for opening portions of a split die unequal amounts so that a workpiece, having a bulge along its length intermediate its ends, can be partially ejected to transfer fingers without losing control over the workpiece.

Another object of the invention is to provide means for opening one portion of a split die an initial amount before the other portion of the split die is opened, whereby, in the final open position, the first portion will be open a greater amount than the second portion.

A further object of the invention is to provide separate toggle means for operating portions of a split die, the toggle means being actuated by a single mechanism operated in timed relation to the movement of the machine gate.

Still another object of the invention is to provide a split die having transverse sections which may be opened independently of one another.

Other objects and advantages of the invention will in part be obvious and will in part be apparent from the specification.

Generally speaking, in accordance with the invention, an open die is split along a plane or planes perpendicular to the axis of the central cavity so that portions of the die halves may be opened unequal amounts. A ram-operated toggle mechanism is provided for opening and closing the separate portions of the die halves and means are provided to cause the toggles to travel through different arcs to effect the differences in the amounts which the die half portions open and close.

The invention accordingly comprises the features of construction, combination of elements and arrangements of parts which will be exemplified in the construction hereinafter set forth, and the scope of the invention will be indicated in the claims.

For a fuller understanding of the invention, reference is had to the following description taken in connection with the accompanying drawings, in which:

FIG. 1 is a side elevational view of a double blow open die machine, the apparatus of the invention forming a part thereof;

FIG. 2 is a partial sectional view taken along line 2—2 of FIG. 1, showing a die in the open position;

FIG. 3 is a partial sectional view taken along line 3—3 of FIG. 2;

FIG. 4 is a partial sectional view similar to FIG. 2, showing only the die sections but at an enlarged scale, the die being shown in the closed position;

FIG. 5 is a partial elevational view showing the faces of two dies in the closed position; and FIG. 6 is a partial sectional view of the toggle grip elements shown in FIG. 2, the toggles being at the closed die position.

Referring now to FIGS. 1 and 2, a machine frame 11 has journalled therein a crank shaft 12 having mounted thereon a flywheel 13 driven through a belt 14 from a suitable source (not shown). A shaft 15 is also journalled in the machine frame and has a gear 16 keyed thereon which meshes with a gear 17 keyed to crankshaft 12. Gear 16 is provided with an internal cam surface 18, and mounted to shaft 15 adjacent the face of gear 16 is an external cam 19. A bell crank 21 is pivoted to the machine frame at 22 with a cam follower 23 being pivoted to one end of the bell crank. Cam follower 23 is disposed to engage the surfaces of internal cam 18 and external cam 19 to oscillate the bell crank responsive to the profiles of the cams as shaft 15 is rotated.

A ram 24 is slidably mounted in the machine frame with a link 25 pivoted to the outer end thereof. Link 25 is provided with an adjustable block 26 to which is pivoted the other end of bell crank 21. As shown in FIG. 2, ram 24 extends completely through the machine frame and is provided with a cut-out section 27 in which toggle blocks 28 and 29 ride. For convenience, the ram end will be indicated as 31. The cut-out section 27 in ram 24 has a transverse face A defined by ram end 31 and a transverse face B axially displaced from face A. Toggle block 28 abuts face B and is held in spaced relation to face A by means of a pin 32 slidably mounted in toggle block 29 and extending between face A and the side of the toggle block 28 opposite to the side in contact with face B. This construction is shown with greater clarity in FIGS. 2, 3 and 6.

A pair of rods 33 are slidably mounted through ram end 31, the inner end of the rods engaging suitable grooves in toggle block 29 as is clearly shown in FIG. 3. Adjustable nuts 34 are threaded on to the outer ends of rods 33 and springs 35 encircle the rods between nuts 34 and the end surface of ram end 31 to yieldably urge toggle block 29 toward the left as shown in the figures. A pair of stops 36 extend through and threadedly engage ram end 31 and adjustably limit the position to which toggle block 29 may be urged to the left by springs 35.

As shown in FIG. 2, two wedges, 37 and 38, are slidably mounted within the machine frame, their positions being adjustable by means of adjusting bolts 39 and 40 which threadedly engage blocks attached to the machine frame. Also slidably mounted within the machine frame are toggle rocking blocks 43 and 44, each having a wedge-shaped side in contact with wedges 37 and 38 respectively. By means of adjusting bolts 39 and 40, wedges 37 and 38 can be adjusted to independently move toggle rocking blocks 43 and 44 toward or from the center of ram 24, and bolts 45 threadedly engaging each of the toggle rocking blocks through the machine frame secure the blocks in the selected position.

Pivoted between toggle block 28 and toggle rocking block 43 is a toggle 46, while pivoted between blocks 29 and 44 is a toggle 47. Each toggle is pivoted in such a manner that it will not withdraw from the blocks in which it is pivoted as it draws the blocks toward each other. However, it may be removed by sliding it longitudinally in the pivot grooves.

As shown in FIGS. 2, 4 and 5, the upper or first heading die is split axially into two halves, 48 and 49. The die is also composed of sections, each section forming a plane perpendicular to the axis of the die cavity. As will be hereafter explained, the outer sections of the split die are adapted to open a greater amount than the inner sections thereof. The sections of die half 49 are adapted to move to effect opening and closing of the die while the sections of die half 48 may be mounted stationary within the machine frame or some or all of the sections may be slidably mounted to the frame. As illustrated herein, each die half is composed of four sections, the sections being numbered 51 through 54 for the sake of convenience, section 51 being the section provided at the die surface. The opening half of die section 51 is slidably mounted in the machine frame and is mounted to a plunger 55 which is also slidably mounted in the machine frame and carries at the opposite end thereof a toggle rocking block 56. A toggle 57 is pivoted in toggle block 28 and toggle rocking block 56 to operatively connect the blocks. Die sections 52, 53 and 54 are also slidably mounted in the machine frame and overlie a closing block 61 which is secured to a plunger 62 slidably mounted in the machine frame. Mounted to or forming a part of plunger 62 is a toggle rocking block 63 pivotally connected to toggle block 29 by means of a toggle 64.

As illustrated, the die halves may form an axial die cavity 65 having a section of larger diameter within the die cavity. The die is preferably constructed with the section of larger diameter extending partially into two of the die sections, illustrated herein as sections 52 and 53. Since the workpiece will have an expanded portion along its length intermediate its ends, it may be desirable to have the die sections spaced apart before the forming operation commences. To effect this, a pair of pins 66 are slidably mounted in the machine frame and engage pins 66a axially aligned with pins 66 and slidably mounted in die sections 53 and 54. The outer ends of pins 66a engage the interface of die section 52 adjacent die section 53. Springs 67 acting between the machine frame and pins 66 yieldably urge die section 52 away from die section 53, thereby providing the spacing shown in FIG. 2. Die section 52 will be urged into contact with die section 53 as the punches 68 and 69 are advanced to perform the forming operations. Punches 68 and 69, shown in phantom in FIG. 2, will be mounted on a gate and shifted in any well-known manner. Since the punches and the shifting mechanism form no part of this invention and are well-known in the art, no further description is deemed necessary.

An ejecting pin 71 is slidably mounted in the die cavity and is operated by a slidable ejecting plunger 72 in any well-known manner to eject the workpiece after it has been operated on by punches 68 and 69.

In operation, rod stock would be fed to a cut-off die 75 (FIG. 5), by means of any of the well-known feed devices. At the cut-off die, a preselected length of rod would be severed from the rod stock by a cut-off knife and the severed workpiece would be transferred by a mechanism (not shown) to the die cavity. During transfer the die halves would be in the position shown in FIG. 2. In this open die position, attention is directed to the fact that toggles 47 and 64 make a smaller angle with the vertical for a line of movement of die closure, than do toggles 46 and 57, thus providing for greater separation of die section 51 over die sections 52 through 54. Furthermore, it will be noted that plunger 55 must travel a greater amount than plunger 62 to effect complete closure of the die. Flywheel 13, which rotates continuously, drives gear 16 through gear 17 and, in timed relation to the transfer of the workpiece to the first die station, bell crank 21 will be rotated in a counter-clockwise direction, as shown in FIG. 1, due to the profile of cams 18 and 19. Counterclockwise rotation of bell crank 21 advances ram 24 in a direction of the arrow in FIG. 2. Since toggle block 28 is in contact with surface B on ram 24, the toggle block will be moved toward the left, causing rotation of toggles 46 and 57 to advance plunger 55. It is noted that toggle block 28 will also slidably move with relation to ram 24 in the same direction as plunger 55, due to the extension of toggle 46 as it rotates. Toggle block 29 will also be carried toward the left by means of rods 33, thereby advancing plunger 62 toward the closed position. Since die sections 52 through 54 are open the least amount, they will attain the closed position in contact with the workpiece before closure of section 51 is effected. When plunger 62 reaches its forward or closed die position, toggle block 29 will cease moving toward the left and continued movement of ram 24 will cause springs 35 to be compressed, thus allowing the ram 24 to move while toggle block 29 remains stationary. Toggle block 28 will continue to be advanced by ram 24 until die section 51 is fully closed. At that time, toggle block 28 will abut toggle block 29 to lock die section 49 in the closed position, the fully closed position of the toggle blocks as shown in FIG. 6.

When the die sections are fully closed, the workpiece will be headed or otherwise worked by punches 68 and 69 and the workpiece will be expanded to fill the die cavity. During the working operations, the die sections will remain closed due to the dwell profile of cams 18 and 19.

Upon completion of the expanding operation, gear 16, which rotates in timed relation to the movement of the gate, moves the cam surfaces past the dwell point and commences withdrawal of ram 24 to the right. As the ram is withdrawn, pin 32 extending between left face A of the ram and toggle block 28, moves the toggle block to the right as shown in FIG. 6, thereby commencing opening of die section 51. Die sections 52 through 54 will be held closed by springs 35 during initial movement of the ram. When stops 36 advance into engagement with toggle block 29, continued movement of the ram will thereafter carry toggle block 29 to the right to open the die sections controlled by plunger 62.

It is thus evident that die section 51 of die half 49 will open a greater amount than die sections 52 through 54. The amount of the larger opening will be sufficient to clear the expanded section between the interface of the die halves, while the opening of the smaller die sections will be sufficient only to allow the workpiece to be partially ejected from the die. The workpiece is ejected by means of ejecting pins 71 and ejecting plunger 72 operated in timed relation to the movement of the flywheel. Thus, it is seen that control over the workpiece is still maintained even though a portion of the die is sufficiently opened to clear the expanded portion between the interface of the die halves.

Thereafter, the transfer mechanism (not shown) will transfer the workpiece to the next die station. This station may comprise die halves 81 and 82 (FIG. 5). Since the operations performed in the die formed by die halves 81 and 82 are, in this example, the final operations, it is not necessary that control of the workpiece be maintained and, therefore, the die halves need not be formed in sections. Thus, die half 82 may be closed by a single or double-arm plunger 83 activated by a single toggle block 84. Plunger 83 and toggle block 84 would be operated to separate the die halves a sufficient amount so that the workpiece may fall by gravity from the die. If intermediate die stations are provided, the die at each station may comprise sections which are opened and closed, as heretofore described.

If desired, the last section at a die station, such as die section 54, may be a solid die rather than a split die. A solid die may be used if an extrusion operation is to be combined with a heading operation. In such case, the split die can be used as described above and the initial ejection of the workpiece must be sufficient to clear the solid extrusion die.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a header or like machine having a frame, the combination of:
   (a) at least one die having a cavity, said die composed of,
      (i) two die halves divided along a plane passing through the axis of the die cavity,
      (ii) a plurality of sections divided along parallel planes perpendicular to the axis of the die cavity,
   at least one die half being slidably mounted in the machine frame,
   (b) a first mechanism cooperatively connected to less than all the sections of the slidable die half, said first mechanism adapted to fully close the associated die sections and open said sections a first amount transversely to the axis of said cavity,
   (c) a second mechanism cooperatively connected to the remaining sections of the slidable die half, said second mechanism adapted to fully close the associated die sections and open said sections a second amount transversely to the axis of said cavity, the second amount differing from the first amount, and
   (d) single means slidably mounted in the frame, for operating both of said first and second mechanisms.

2. The structure defined in claim 1, wherein said means for actuating said first and second mechanisms comprises a single ram slidably mounted in the frame to actuate both said first and second mechanisms.

3. The structure defined in claim 2, wherein an internal and an external cam are provided to actuate said ram.

4. The structure defined in claim 3 and further including a bell crank pivoted to the frame with one portion thereof in contact with said cams, the other portion thereof being operatively connected to said ram whereby the bell crank is oscillated about its pivot to linearly actuate said ram in response to the changing of the cam profile.

5. The structure defined in claim 4 and further including means for changing the position of connection of said bell crank to said ram, to adjust the limit of advance of said ram.

6. The structure defined in claim 2, wherein said first mechanism comprises a plunger slidably mounted in said machine frame and cooperating with said die sections, a toggle block carried by said ram, and toggles pivoted between said frame and said toggle block and between said plunger and said toggle block to transfer linear motion of said ram along one line to linear motion of said plunger along a transverse line.

7. The structure defined in claim 6 and further including means to adjust the location of the point of pivot of said toggle block to said frame along a line parallel to the direction of sliding movement of said plunger.

8. The structure defined in claim 2, wherein said second mechanism comprises a plunger slidably mounted in said machine frame and cooperating with said die sections, a toggle block carried by said ram, a toggle rocking block mounted in said frame, and toggles pivoted between said toggle rocking block and said toggle block and between said plunger and said toggle block to transfer linear motion of said ram along one line to linear motion of said plunger along the transverse line.

9. The structure defined in claim 8, wherein said toggle rocking block is provided with an inclined surface and said mechanism further includes an inclined wedge slidably mounted between said toggle rocking block in said frame, the inclined surface of said wedge being in contact with the inclined surface of said toggle rocking block, and means for adjusting the position of said inclined wedge to adjust the location of the point of pivot of said toggle in said toggle rocking block along a line parallel to the direction of sliding movement of said plunger.

10. In a header or like machine comprising in combination, a frame, a ram slidably mounted in said frame, a first toggle block slidably mounted in said ram and cooperatively engaging a second toggle block slidably mounted in said ram, means to urge said toggle block out of contact with said first toggle block, a first pivot block mounted in said frame, a second pivot block mounted in said frame, a first toggle pivoted between said pivot block and said first toggle block, a second toggle pivoted between said second pivot block and said second toggle block, a first plunger mounted in said frame and adapted to slide transversely to the direction of slidable movement of said ram, a second plunger mounted in said frame and adapted to slide parallel to said first plunger, a third toggle pivoted between said first plunger and said first toggle block and a fourth toggle pivoted between said second plunger and said second toggle block.

11. The structure defined in claim 10, wherein said ram is provided with a cut-out section having axially spaced walls between which said first and second toggle blocks are mounted, wherein said means to urge said toggle blocks into separation comprises a pin slidably mounted in said second toggle block and extending between one wall of said ram and said first toggle block, to urge said first toggle block into contact with one of said walls, an axial rod secured at one end to said second toggle block and extending slidably through said ram, and resilient means acting on said rod to yieldably urge said second toggle block into contact with the other of said walls.

12. The structure defined in claim 11 and further including adjustable stops mounted in said ram for determining the maximum approach of said second toggle block toward the other of said walls.

13. The structure defined in claim 12, wherein said adjustable stops comprise at least two bolts threadedly engaging said ram and extending through the other of said walls to prevent said second toggle rocking block to contact the wall through which said adjustable stops extend under the urging of said resilient means.

14. In a header or like machine having a frame, a combination of:
(a) at least one die having a cavity, said die composed of,
 (i) two die halves divided along a plane passing through the axis of the die cavity,
 (ii) a plurality of sections divided along parallel planes perpendicular to the axis of the die cavity,
 at least one die half being slidably mounted in the machine frame,
(b) a first mechanism cooperatively connected to less than all the sections of the slidable die half, said first mechanism adapted to fully close the associated die sections and open said sections a first amount transversely to the axis of said cavity,
(c) a second mechanism cooperatively connected to the remaining sections of the slidable die half, said second mechanism adapted to fully close the associated die sections and open said sections a second amount transversely to the axis of said cavity, the second amount differing from the first amount,
(d) means to separate in an axial direction the sections affected by said first mechanism from the sections affected by said second mechanism, and
(e) single means slidably mounted in the frame and coupled to only one of said mechanisms for actuating both of said first and second mechanisms.

15. In a header or like machine having a frame, the combination of:
(a) a pair of dies forming a single die station, the dies being axially adjacent and having a die cavity formed in both dies, the innermost die being a solid die adapted to have extrusion take place therein, the outermost die being an opening die composed of,
 (i) two die halves divided along a plane passing through the axis of the die cavity,
 (ii) a plurality of sections divided along parallel planes perpendicular to the axis of the die cavity,
 at least one die half of the opening die being slidably mounted in the machine frame,
(b) a first mechanism cooperatively connected to less than all the sections of the slidable die half, said first mechanism adapted to fully close the associated die sections and open said sections a first amount transversely to the axis of said cavity,
(c) a second mechanism cooperatively connected to the remaining sections of the slidable die half, said second mechanism adapted to fully close the associated die sections and open said sections a second amount transversely to the axis of said cavity, the second amount differing from the first amount,
(d) means slidably mounted in the frame and abutting only one of said mechanisms for operating both of said first and second mechanisms.

References Cited by the Examiner

UNITED STATES PATENTS

| | | | |
|---|---|---|---|
| 1,084,156 | 1/14 | Loss | 78—17 |
| 1,755,312 | 4/30 | Brennan | 10—16 |
| 1,889,004 | 11/32 | Pracny | 10—16 |
| 2,362,970 | 11/44 | Bolland | 10—16 |
| 2,759,379 | 8/56 | Brandt | 78—17 |

WILLIAM J. STEPHENSON, *Primary Examiner.*